July 4, 1944.  H. R. PATTERSON  2,353,067
SELF-CLEANING PLATE FEEDER
Filed July 8, 1943  2 Sheets-Sheet 1
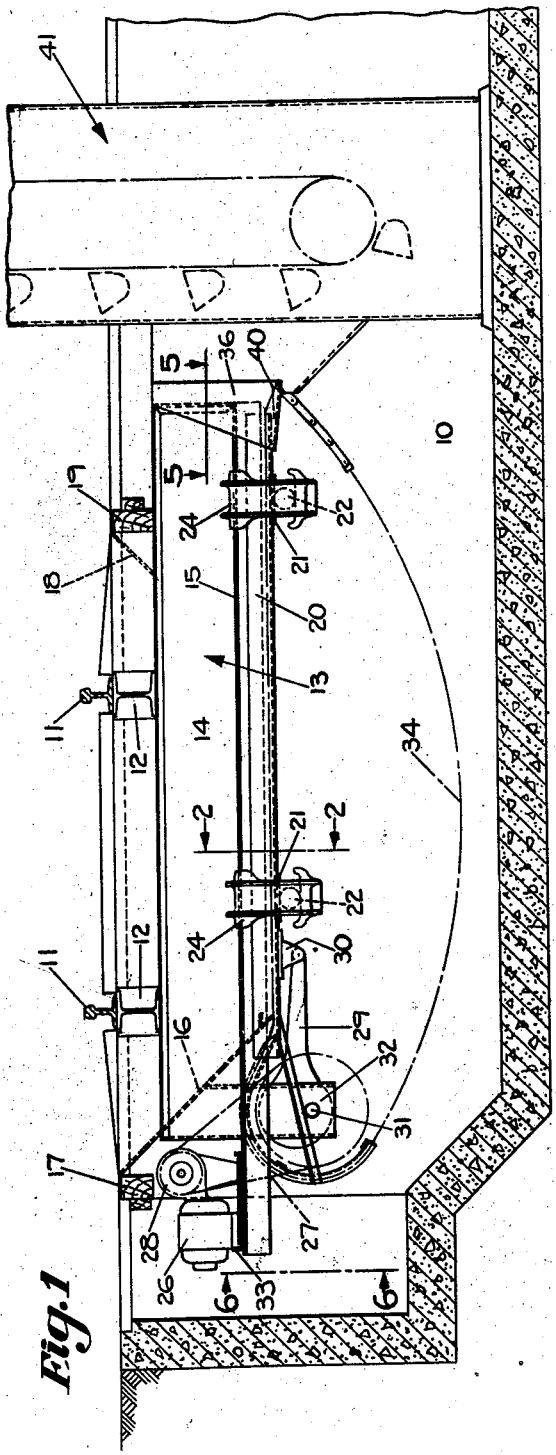
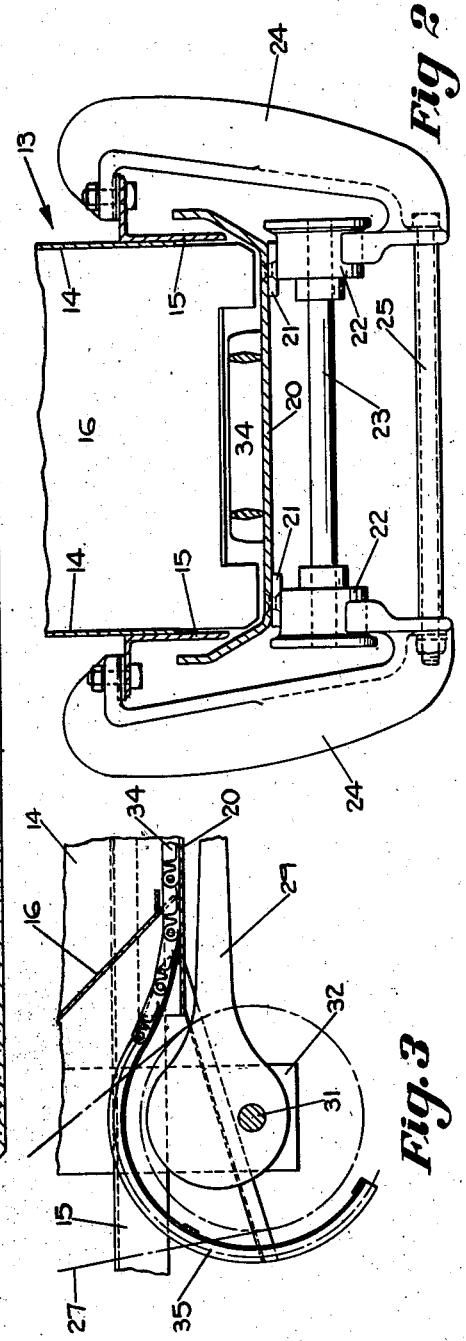
INVENTOR:
HARRY R. PATTERSON,
By Chas. M. Nissen,
ATTY.

July 4, 1944. H. R. PATTERSON 2,353,067
SELF-CLEANING PLATE FEEDER
Filed July 8, 1943 2 Sheets-Sheet 2
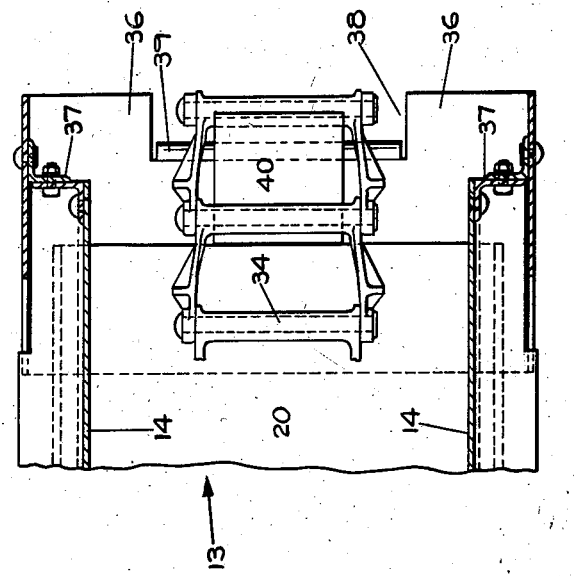
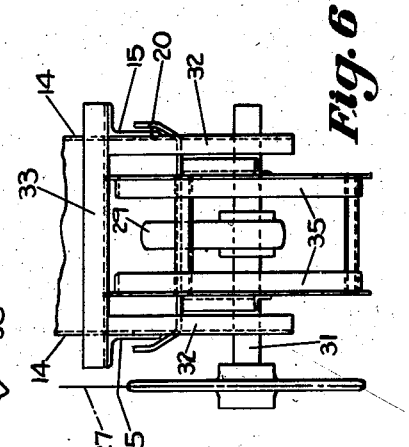
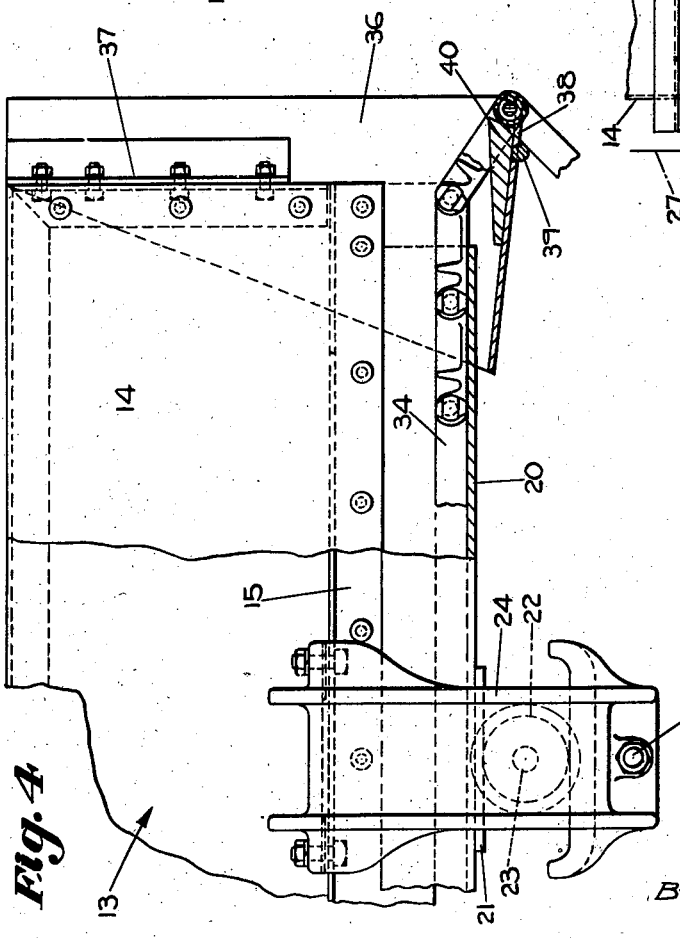
INVENTOR:
HARRY R. PATTERSON,
By Chas. M. Nissen,
ATTY.

Patented July 4, 1944

2,353,067

UNITED STATES PATENT OFFICE 2,353,067

SELF-CLEANING PLATE FEEDER

Harry R. Patterson, Columbus, Ohio, assignor to The Jeffrey Manufacturing Company, a corporation of Ohio Application July 8, 1943, Serial No. 493,872

7 Claims. (Cl. 198—227)

This invention relates to a plate feeder. An object of the invention is to provide a plate feeder which is self-cleaning in that all material may be removed therefrom.

A further object of the invention is to provide an improved plate feeder in which conveyor mechanism such as an endless chain is employed to aid the feeding operation produced by reciprocation of the feeder plate or deck and in which the feeder may be substantially completely cleaned of material.

Other objects of the invention will appear hereinafter, the novel features and combinations being set forth in the appended claims.

In the accompanying drawings:

Fig. 1 is a side elevational view of an installation including my invention.

Fig. 2 is an enlarged transverse sectional view taken on the line 2—2 of Fig. 1 looking in the direction of the arrows.

Fig. 3 is an enlarged sectional elevational view of the rear end of a conveyor of my invention.

Fig. 4 is an enlarged sectional and elevational view of the discharge end of the conveyor.

Fig. 5 is an enlarged sectional plan view of the discharge end of the conveyor, taken on the line 5—5 of Fig. 1 looking in the direction of the arrows; and Fig. 6 is an end view of the bottom portion of the rear end of the conveyor taken on the line 6—6 of Fig. 1 of the drawings.

It is a general characteristic of reciprocating pan or plate conveyors that they are not self-cleaning and as a consequence they are always left with an appreciable amount of material on them. The conveyor of my invention is substantially entirely self-cleaning and in addition to the self-cleaning characteristics, the mechanism which provides for this function also appreciably increases the capacity of the conveyor.

Referring particularly to Fig. 1 of the drawings the self-cleaning conveyor or feeder of my invention is shown in one typical installation, it being understood that the feeder or conveyor may be employed in a wide variety of installations. As illustrated in said Fig. 1, there is provided a pit 10 which may be a poured concrete monolith and which is illustrated as situated below the rails 11 of a railway, said rails 11 being supported over the pit 10 by means of I-beams 12.

Mounted transversely of the rails 11 and I-beams 12 and rigidly attached to and supported by the latter is a main frame 13 of the plate feeder. Said main frame 13 is formed by a pair of spaced longitudinally extending hopper forming side plates 14. Said side plates 14 are attached at their tops to the bottoms of the I-beams 12. Adjacent their bottoms the side plates 14 are provided with longitudinally extending angle members 15 which are rigidly attached to said side plates 14 and constitute an important part of the main frame.

The feeding hopper includes a sloping rear end plate 16 which is connected along its edges to the side plates 14 and preferably extends up to a position adjacent the tops of the I-beams 12 where it is supported by a transversely extending wood beam 17 which extends across the top of the pit. The forward plate of the hopper is seen at 18 and it extends from a transversely extending wood beam 19 and terminates adjacent the tops of the side plates 14 so that the material can pass freely under it to the discharge end of the conveyor or feeder which in Fig. 1 of the drawings is seen at the right-hand end thereof.

The deck or feed plate of the conveyor is in the form of a trough 20 which, as best illustrated in Fig. 2 of the drawings, extends longitudinally below the side plates 14 and the vertical flanges of the angle members 15 so that material received in the hopper formed by the side plates 14, the rear or end plate 16 and the plate 18, is received and supported by said bottom feeder plate 20. The flanged edges of the plate 20 overlap the angle members 15 on the outsides thereof sufficiently to prevent any loss of material, but provide for free reciprocation of the plate 20 with respect to the stationary main frame and hopper forming plates above described.

The bottom plate 20 is supported by virtue of spaced short rails 21 which ride on spaced wheels or rollers 22, there being two of such wheels 22 mounted on each of two axles 23. The wheels 22 in turn ride upon rail bearing surfaces provided by spaced brackets 24, there being four of such spaced brackets connected in pairs at spaced points adjacent the front and rear, respectively, of the plate or trough 20. It is thus evident that the plate or trough 20 is mounted upon four roller bearing points, two adjacent its forward end and two adjacent its rearward end, thus providing adequate support therefor while also providing for its free reciprocation.

As illustrated best in Fig. 2 of the drawings, the brackets 24 are connected to the angle members 15 adjacent their tops and at their bottoms are rigidly connected together by a cross spacer tube and elongated bolt attaching device 25.

To supply reciprocatory motion to the plate 20 there is provided an electric driving motor 26 which drives chain and sprocket drive mechanism 27 preferably through a speed reducing device 28. Said chain and sprocket mechanism in turn drives an eccentric 29 which is pivotally attached by bracket 30 to the trough or pan 20. As clearly illustrated in Fig. 6 of the drawings, the eccentric 29 includes a shaft 31 which is journaled in spaced bearings carried by spaced downwardly extending frame members 32 which are rigidly attached to and suspended from the side plates 14 and angle members 15.

As illustrated in Fig. 1 of the drawings, the motor 26 and speed reducing mechanism 28 are mounted on a platform carried by a rearward extension of the angle members 15 and adjacent this platform said angle members 15 are preferably connected by a reinforcing cross angle 33 (see Fig. 6).

It is well known that a plate feeder having a construction so far described will operate when reciprocated to feed material over its free end which is the right-hand end as viewed in Fig. 1 of the drawings, since the material is free to move with the plate 20 as it reciprocates to the right and is held against movement so that the plate 20 slides under the material when the plate moves to the left due to the fact that the material banks against the rear end plate 16 or, in other words, against the rear plate of the hopper. The pressure of the material in the hopper also co-operates to effect this feeding action.

A plate or reciprocating deck feeder of this type, however, is generally restricted in its practical length and most such feeders do not have a length in excess of ten or twelve feet, since for feeders of greater length the friction of material on the stationary side plates 14 approaches the friction of the material against the bottom plate, thus tending to prevent free movement of the material as the bottom plate moves forward or to the right as viewed in Fig. 1 of the drawings.

Furthermore, such a reciprocating feeder will not clean itself because to do this, something would have to be present against which the material would bank as the plate 20 made its return movement or movement to the left as viewed in Fig. 1 of the drawings. By the apparatus which I have provided it is possible not only to increase appreciably the length of the feeder, but in addition its capacity is materially increased, and furthermore the unit is made self-cleaning.

To accomplish these results I provide conveyor mechanism preferably in the form of an endless chain 34 which rests on the bottom plate or trough 20 and the lower or return run of which merely hangs below said plate 20 as illustrated in Fig. 1 of the drawings. At the rear end of the unit an arcuate guide 35 formed by a pair of spaced angles which are bent in a semicircle and are interconnected by cross-pieces, is provided to support the chain 34 and guide it around and out of the path of the eccentric 29.

Adjacent the front or discharge end of the pan 20 and main frame 13 I provide a stationary U-shaped frame member 36 the sides of which are rigidly attached to the side plates 14 of the main frame 13 by two pair of interconnected angle members 37 one pair being adjacent each side, each of said pair of angle members being bolted together and one of each pair being connected to a side plate 14 and a side member of the frame 36, as clearly illustrated in Fig. 5 of the drawings. The frame member 36 is, of course, stationary since it is rigidly attached to the stationary side plates 14.

The bottom plate of the frame member 36 is provided with a central notch 38, the rear or left-hand or bottom edge of which is provided with a bearing rod 39 which is preferably welded thereto. As clearly illustrated in Fig. 4 of the drawings, the bottom plate of the frame member 36 slopes downwardly relative to the plate 20 and extends from a position slightly to the rear or the left of the front edge of the plate 20, to a position to the right of said plate 20. Since the plate 20 reciprocates, it is, of course, evident that the position of the leading or front edge thereof with respect to the frame member 36, changes during operation.

The central forward or right-hand portion of the bottom plate of frame member 36 is provided with a shoe or tooth 40 having the function of a hook. Since said shoe, tooth or hook 40 extends in the space between adjacent cross-members of the chain 34, it will hook on to said cross members and prevent return movement of the chain 34 with the plate 20. However, the chain 34 is free to move forwardly or to the right with the plate 20 and consequently the chain 34 will travel in a step by step manner along the plate 20 as said plate 20 reciprocates, since during the forward travel the chain 34 will be advanced sufficiently to move it at least a distance equal to one link of the chain 34 and thus carry the chain 34 forward so that for successive reciprocations the chain will be advanced a distance equal to one link thereof with respect to the plate 20.

In the operation of the device, material, of which coal is a good illustration, will be fed to the hopper provided by the walls 14, 16 and 18 and delivered to the bottom plate 20. The plate, deck or trough 20 will reciprocate since it is driven by the drive mechanism including motor 26 etc. As the deck or plate 20 moves to the right during each reciprocation, the material, such as coal, will move freely with it except for some retarding influence due to the stationary side walls 14.

For the reverse or left hand travel of the plate 20 the material will slide over the plate due largely to the fact that said material will be banked against the rear end plate 16 and due to the pressure of the material holding it down. The material will be further held against rearward movement of the plate 20 due to the friction created by the chain 34 since said chain 34 will be held against rearward movement with the plate or deck 20 by virtue of the fact that it is hooked to the shoe or tooth 40. As a consequence, the plate 20 will slide rearwardly or to the left, as viewed in Fig. 1, beneath the material and chain 34. During the subsequent travel of the plate or deck 20 to the right or in feeding direction, the material and the chain 34 will move substantially as a unit with said plate or deck 20, and the cross-member of the next succeeding link of chain 34 will be hooked over the shoe or tooth 40.

In addition to the fact that the chain 34 thus increases the conveying action of the plate feeder and thus makes possible an extension of the maximum permissible overall length of such a conveyor, it has the further function of providing a clean-out device in that substantially all the material may be conveyed from the plate or deck 20 since the chain 34 will supply the necessary friction to hold the material against reverse travel or movement with the plate 20.

In this connection it is, of course, evident that for the final cleaning out of the feeder, the retarding influence of the rear end plate 16 and the pressure on the material will be lost since in the final operation of cleaning out, the material will be moved progressively to the right of said end plate 16 or, in other words, toward the discharge end of the feeder. It is because of this loss of a banking plate, in the absence of the chain 34 or its equivalent, that it is impossible to clean out the plate feeder by its own reciprocation.

It may be further pointed out that, as illustrated in the drawings, the plate feeder discharges into the boot of elevating conveyor 41 which is merely one possible type of receptacle to receive the material fed by said feeder.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In combination, a conveyor including a material supporting deck, means for reciprocating said deck to convey material relative to said deck, and scraper conveyor mechanism including an endless chain traveling over said deck for conveying material thereover.

2. A conveyor including a bottom plate, means for feeding material to said plate and banking it against one end, means for reciprocating said plate to feed said material from said banked position, and chain conveyor mechanism operable over said plate in steps as said plate is reciprocated to convey material thereover.

3. A conveyor including a bottom plate, means for feeding material to said plate and banking it against one end, means for reciprocating said plate to feed said material from said banked position, and chain conveyor mechanism operable over said plate to convey material thereover.

4. In a reciprocating feeder, a deck, means for feeding material to said deck, means for reciprocating said deck, and chain means extending along said deck and held against reciprocation therewith in one direction for aiding the feeding of material from said deck.

5. A conveyor including a main frame, a bottom plate mounted for reciprocation relative thereto, means for reciprocating said bottom plate, a chain on said bottom plate and movable in one direction therewith, and hook means carried by said main frame for holding said chain against movement as said bottom plate moves in the reverse direction.

6. A conveyor including a main frame, a bottom plate mounted for reciprocation relative thereto, means for reciprocating said bottom plate, a chain on said bottom plate and movable in one direction therewith, and hook means for holding said chain against movement as said bottom plate moves in the reverse direction.

7. A conveyor including a main frame, a bottom plate mounted for reciprocation relative thereto, means for reciprocting said bottom plate, a chain on said bottom plate and movable in one direction therewith, and means for holding said chain against movement as said bottom plate moves in the reverse direction.

HARRY R. PATTERSON.